April 3, 1934. F. J. BURNS Re. 19,126

SHADE ROLLER

Original Filed Aug. 25, 1931

INVENTOR.

BY Fred J. Burns.

Frank C. Farman.

ATTORNEY.

Reissued Apr. 3, 1934 Re. 19,126

UNITED STATES PATENT OFFICE 19,126

SHADE ROLLER

Fred J. Burns, Saginaw, Mich., assignor to The Columbia Mills, Saginaw, Mich., a corporation of New York Original No. 1,905,980, dated April 25, 1933, Serial No. 559,227, August 25, 1931. Application for reissue October 10, 1933, Serial No. 694,160

23 Claims. (Cl. 156—36)

This invention relates to shade roller construction, and particularly to the winding mechanism thereof.

One object of the invention is to provide a simple and substantial winding mechanism, made up of a minimum number of parts, which will not get out of order; which will be cheap to manufacture, and which can be readily installed and assembled.

Another object is to provide new and novel means for anchoring the outer end of the spring, so that it can be readily positioned or removed, and which when the roller is assembled, is locked in position.

A further object is to provide a large and rugged self centering bearing of simple construction, which will run accurate and true, and which will not become sloppy with long use.

A still further object is to provide a winding mechanism so constructed and assembled that all parts remain in their true assembled working relation, regardless of severe blows or jars caused by hammer blows when gudgeons are inserted, or when the roller repeatedly falls on the projecting spear.

A further object still is to mount and secure the spool bearing on the spool so that it forms a unitary structure therewith, and provide a rugged bearing which will not chatter and which will be noiseless in operation.

The above and other objects will appear as the specification progresses, reference being had to the accompanying drawing in which I have shown the preferred embodiment of my invention, and in which like reference numerals indicate like parts throughout the several views thereof.

In the drawing—

Figure 2:
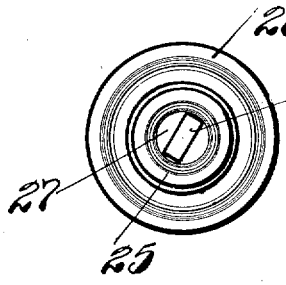
Fig. 2 is an end view thereof.
Figure 1:
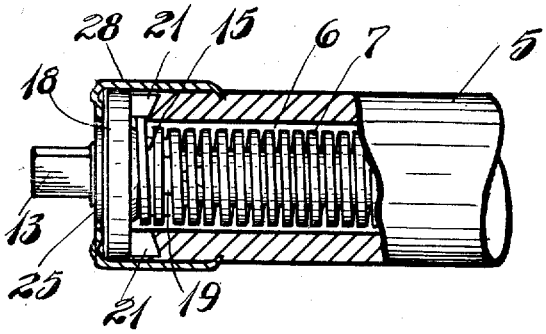
Fig. 1 is a part sectional side view of one end of a shade roller constructed in accordance with my invention.
Figure 3:
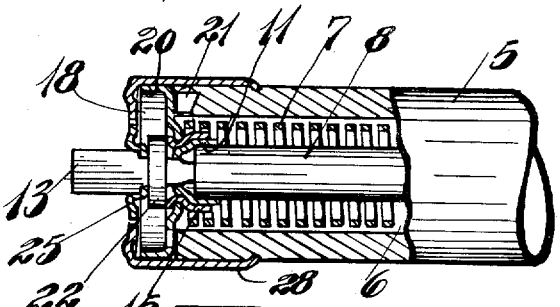
Fig. 3 is a longitudinal sectional view through the winding mechanism.
Figure 4:
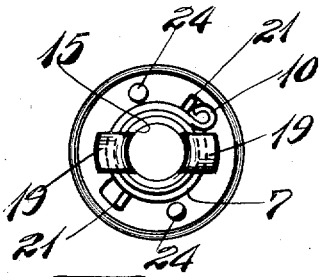
Fig. 4 is a detail end view illustrating the manner of anchoring the one end of the spring.
Figure 5:
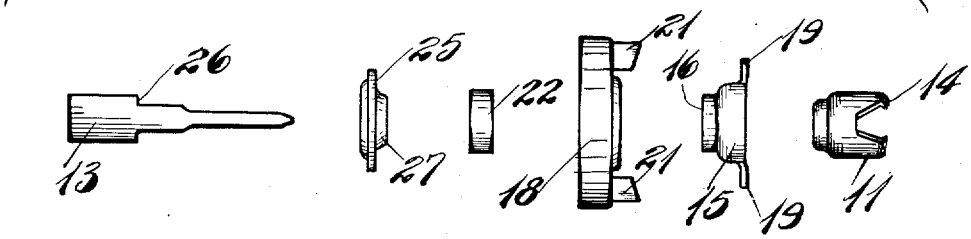
Fig. 5 is a view showing the various parts in spaced apart relation.
Figure 7:
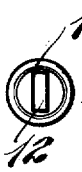
Fig. 7 is an end view of the spindle ferrule.

Referring now to the drawing in which I have shown the preferred embodiment of my invention, the numeral 5 indicates the body of the roller which can be of any suitable material, wood being most common in use, this is centrally bored as shown at 6, and is adapted to accommodate the conventional spring and spindle, 7 and 8 respectively, the inner end of the spindle having a saw cut as shown at 9, and the end of the spring is shaped to fit and seat thereon, the opposite end being formed with a loop 10 for a purpose to be later described.

Figure 6:
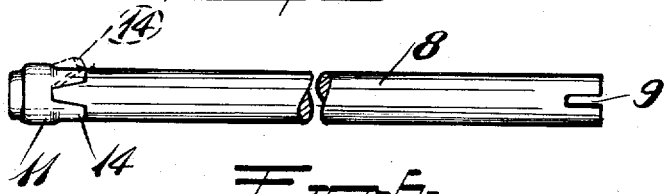
Fig. 6 is a detail part sectional side view of the spindle and spindle ferrule, the dotted lines showing the position of the prongs before being forced into the spindle.

A ferrule member 11 fits over the outer end of the spindle, the head being reduced and projecting slightly beyond the end thereof, said head being formed with a rectangular opening 12 adapted to accommodate the end of the conventional spear 13, which projects into the end of the spindle, the ferrule being provided with spaced apart legs or prongs 14 (shown in dotted lines in Fig. 6) and is adapted, when the ferrule is placed in position, to be forced into the spindle to hold the ferrule tightly in place.

A spool bearing 15 is journaled on the ferrule member 11 and is formed with a reduced neck portion 16 which, when assembled, projects into a centrally disposed opening provided in a spool 18 and is solidly crimped over the edge thereof forming a solid unit therewith, the inner end of said spool bearing fitting over the ferrule member 11 and is formed with spaced apart laterally projecting wings 19 for a purpose to be presently described. The outer rim of the spool is turned as shown at 20, and spaced apart ears 21 are punched from the body of the spool and project longitudinally therefrom, said ears being adapted to pierce and be embedded in the roller when the mechanism is assembled.

A ratchet 22 is mounted on the spear directly adjacent the turned end of the spool bearing and the usual diametrically opposite pawls not shown are pivotally mounted on the spool by means of rivets 24, and are adapted to engage the ratchet in the usual manner, a hub 25 being mounted on the spear, and is interposed between the ratchet and the shoulder 26 of said spear, said hub having a centrally disposed dished center section 27 of a size to receive the head of the spear. A ferrule 28 fits over the end of the roller in the usual manner, the inner end being crimped to engage the wood as shown.

In practice the spool 18 is first formed to shape and the pawls 23 are mounted thereon, the spool bearing 15 is then secured to the spool forming a unit therewith, I then take the spear and assemble the hub, ratchet, spool unit, and spindle ferrule thereon, force the spear inwardly to swedge the spear in the ferrule, after which I drive the end of the spear into the spindle and force the prongs 14 of the ferrule into the spindle to rigidly secure it in position. The spring 7 is then placed in position, the one end being anchored in the saw cut 9, the opposite looped end being threaded behind the wings 19, and the loop 10 will then be locked behind the ears 21, and as the winding unit is mounted in the bore of the roller, these ears together with the looped end of the spring will pierce the wood and lock the end of the spring securely in position. To detach, it is merely necessary to remove the spring assembly from the roller, bend the end of the spring to clear the ears, and it can be easily unwound from the bearing.

I wish to direct particular attention to the fact that the general assembly absolutely eliminates the possibility of the mechanism becoming sloppy so that the pawls do not engage at all times; there can be no endwise movement of the ratchet without a corresponding movement of the spool on which the pawls are mounted; the mechanism operates smoothly and easily, is evenly balanced, and will wear for an indefinite length of time.

From the foregoing description it will be obvious that I have perfected a very simple, substantial, and economical winding mechanism for shade rollers.

What I claim is:

1. A shade roller comprising a body, a spindle extending thereinto, a spool mounted on said spindle and secured to said body, and a spring anchored to one end of the spindle, the opposite end of said spring engaging said spool and being embedded, and anchored in the end of the roller body when the roller is assembled.

2. A shade roller comprising a body, a spindle extending into said body, a spool rotatably mounted thereon, a spool bearing secured to the spool, a spring mounted on the spindle and anchored to one end thereof, the opposite end being threaded on the spool bearing, and embedded and anchored in the end of the roller body when the roller is assembled.

3. A shade roller comprising a body, a spindle extending thereinto, a spool mounted on the spindle, a spool bearing rigidly secured thereto and having wings projecting laterally therefrom, a spring mounted on the spindle, one end being anchored thereto, the opposite end being threaded behind said wings, and means on the spool for preventing the unwinding of the threaded end of said spring during the assembling of the roller.

4. A shade roller comprising a body, a spindle mounted therein and provided with a ferrule on one end thereof, a spool having a spool bearing rigidly secured thereto and mounted on said spindle, laterally projecting wings on said bearings, a spring mounted on the spindle and anchored to one end thereof, the opposite end being looped and threaded behind said wings, and means on the spool for anchoring the threaded end of the spring as the roller is being assembled.

5. A shade roller comprising a body, a spindle mounted therein, a ferrule on the end of the spindle, a spool, a spool bearing secured thereto and formed with laterally projecting wings, a spring mounted on the spindle and anchored to one end thereof, the opposite end being looped and threaded behind the wings of the spool bearing, and ears on the spool for engaging the looped end of the spring and piercing the body of the roller when said roller is assembled.

6. A shade roller comprising a body, a spindle mounted therein, a ferrule secured to the end of the spindle, a spear mounted in said spindle, a ratchet mounted thereon, a spool, a spool bearing rigidly secured thereto and formed with laterally projecting wings, a spring mounted on the spindle and secured to one end thereof, the opposite end being looped and threaded behind said wings, and ears on the spool for anchoring the looped threaded end of the spring.

7. A shade roller comprising a body, a spindle mounted therein, a spool having a spool bearing formed with wings rigidly secured thereto, a spring anchored to one end of the spindle, the opposite end being looped and threaded behind the wings, longitudinally projecting ears on the spool for engaging the looped end of said spring, and adapted when the roller is assembled to pierce the wood and force the loop against the body of the spool.

8. A shade roller comprising a body, a spindle mounted therein, a spear mounted in the spindle, a ratchet, a spool mounted thereon and having a bearing rigidly secured thereto and formed with laterally projecting wings, a spring mounted on the spindle and anchored to one end thereof, the opposite end being looped and threaded behind the bearing wings, and longitudinally extending ears on the spool adapted to engage the looped end of the spring to prevent the unwinding thereof.

9. The combination with a roller of a spindle extending thereinto, a spool mounted on said spindle, a spring anchored to one end of the spindle, the opposite end being looped and detachably engaging the spool, said end being adapted to pierce the end of the roller when the mechanism is assembled.

10. The combination with a roller of a spindle mounted therein, a spool mounted on said spindle and formed with spaced apart ears, a spring anchored to one end of the spindle, the opposite end being looped and detachably engaging the spool, said ears and loop being adapted to pierce the end of the roller when the mechanism is assembled.

11. The combination with a roller, of a spindle extending thereinto, a spool journaled on the end of said spindle and provided with laterally projecting ears, a spring anchored to one end of said spindle, the opposite end being threaded behind said ears and anchored to said spool.

12. The combination with a roller of a spindle extending thereinto, a ferrule secured on the end of the spindle and formed with a shouldered outer end, a spool journaled on the said spindle ferrule and provided with laterally projecting ears, a spring anchored to the inner end of the spindle, the opposite end of the spring being threaded behind said ears and anchored to said spool.

13. The method of assembling a shade roller winding mechanism which consists in providing a spool, rigidly securing a spool bearing thereto to form a unit, providing a shouldered spear and assembling a hub, ratchet, spool unit, and spindle ferrule thereon in facial contact, and then driving the spear into said spindle ferrule to wedge the spear in said ferrule, providing a spindle and driving the spear into the spindle and rigidly securing the ferrule in position.

14. A shade roller construction of the class described including a roller, a spindle extending into said roller, a spool mounted on said spindle and formed with a centrally disposed opening therein, a spool bearing projecting into the opening in the spool and having its outer end crimped to rigidly secure it in position and form a unitary spool assembly, and a spring anchored to one end of said spindle and to the spool assembly respectively.

15. In a shade roller construction of the class described including a roller having an opening in one end thereof, a spindle mounted in said opening, a ferrule mounted on one end of said spindle, a spool provided with a centrally disposed opening, a spool bearing projecting into said opening, the outer end being crimped over to form a solid unit with the spool, a spring mounted on said spindle and anchored to one end thereof, and wings on the unit for anchoring the opposite end of said spring.

16. A shade roller construction of the class described and including a roller, a spindle mounted therein, a ferrule non-rotatably mounted on one end of said spindle, a spool having a centrally disposed opening therein, a spool bearing extending into said opening and rigidly secured to said spool to form a unitary spool assembly, wings on said spool bearing, a spear projecting through said bearing and anchored in the spindle, a ratchet on the spear, and a spring anchored to said spindle and to the spool assembly respectively.

17. A shade roller of the class described including a roller having an opening in one end thereof, a spindle mounted in said opening and having a ferrule on one end thereof, a spool formed with a centrally disposed opening therein, a spool bearing projecting into said opening and crimped onto said spool to form a unitary spool assembly, and in which said ferrule is journaled, a spring anchored to one end of the spindle, and means on said spool assembly for anchoring the opposite end of said spring.

18. A shade roller construction of the class described, comprising a roller member having a bored end, a spindle mounted in said bored end, a ferrule mounted on one end of the spindle, a spool provided with a centrally disposed opening therein, a shouldered spool bearing projecting into said opening with its shouldered end crimped over to form a rigid unitary spool assembly in which the ferrule is journaled, a spring anchored to one end of said spindle, and ears on said spool assembly for anchoring the opposite end of said spring.

19. A shade roller construction including a roller having an opening in the one end thereof, a spindle mounted in said opening, a spool formed with a centrally disposed opening therein, a shouldered spool bearing projecting into said opening, and having its outer end crimped over the edges of the opening to form a solid unit with said spool, a ferrule mounted on one end of the spindle and adapted to be journaled in said spool bearing, said ferrule being formed with a reduced neck portion for definitely limiting the outward movement of the spindle with relation to the spool, a spear, a ratchet mounted on the spear, and a spring anchored to one end of said spindle and to the spool unit respectively.

20. A shade roller construction including a roller having a bored end, a spindle projecting into said bored end, a spool mounted on said spindle and formed with a dished center section having a centrally disposed opening therein, a shouldered spool bearing projecting into said opening and having its outer end crimped over the edge of said centrally disposed opening to form a rigid unit with the spool, a ferrule rigidly secured to one end of the spindle and adapted to be journaled in said bearing, and a spring anchored to the opposite end of the spindle and to the spool unit respectively.

21. A shade roller construction of the class described, comprising a roller having a bored end, a spindle mounted in said bored end, a ferrule rigidly secured on one end of said spindle, a spool having a centrally disposed opening therein, a shouldered spool bearing projecting into said opening and having the reduced end crimped over to form a rigid unitary spool assembly and in which said ferrule is journaled, a shouldered spear projecting through said bearing and ferrule and anchored in the end of the spindle, a ratchet interposed between the shouldered section of the spear and the crimped end of the bearing, and a winding spring anchored to said spindle and to the spool assembly respectively.

22. A shade roller construction of the class described including a roller, a spindle extending into said roller, a spool mounted on said spindle and formed with a centrally disposed opening therein, a spool bearing projecting into the opening in the spool and rigidly secured in position to form a unitary spool assembly, and a spring anchored to one end of said spindle and to the spool assembly respectively.

23. A shade roller construction of the class described including a roller having an opening in one end thereof, a spindle mounted in said opening, a ferrule mounted on one end of said spindle, a spool provided with a centrally disposed opening, a spool bearing projecting into the opening in the spool and rigidly secured in position to form a solid unit with the spool, a spring mounted on said spindle and anchored to one end thereof, and wings on the unit for anchoring the opposite end of said spring.

FRED J. BURNS.